United States Patent [19]

Kontz

[11] 3,737,275

[45] June 5, 1973

[54] BLOW NEEDLE AND VALVE

[75] Inventor: Robert F. Kontz, Toledo, Ohio

[73] Assignee: Owens-Illinois, Inc., Toledo, Ohio

[22] Filed: Jan. 17, 1972

[21] Appl. No.: 218,437

[52] U.S. Cl. .............................................425/387 B
[51] Int. Cl. ............................................B29d 23/03
[58] Field of Search......................425/387 B, 324 B, 425/326 B, 242 B

[56] References Cited

UNITED STATES PATENTS 3,048,981   8/1962   Maass ..........................425/387 B X
3,479,421   11/1969  Armbuster et al..........425/387 B UX Primary Examiner—H. A. Kilby, Jr.
Attorney—Philip M. Rice and E. J. Holler

[57] ABSTRACT

One mold half of a blow molding machine carries a slidably mounted hollow blow needle which is driven by air pressure to penetrate the extruded plastic tube after the molds have closed, following which blowing air is supplied through the needle bore to inflate the tube to the shape of the mold cavity. After blowing, the blowing air is exhausted from the blown shape and the blow needle is withdrawn. The valve which controls the supply of needle-positioning and tube blowing pressure is also carried by the mold half, to minimize the time lag and pressure drop.

7 Claims, 7 Drawing Figures

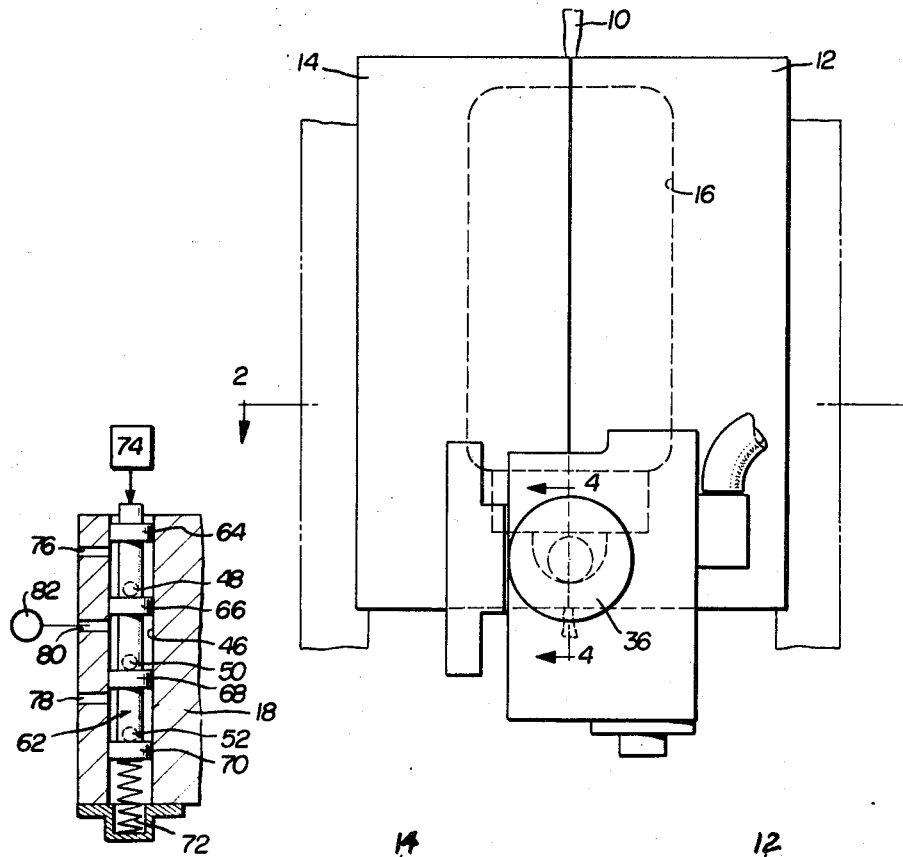
FIG. 1
FIG. 3
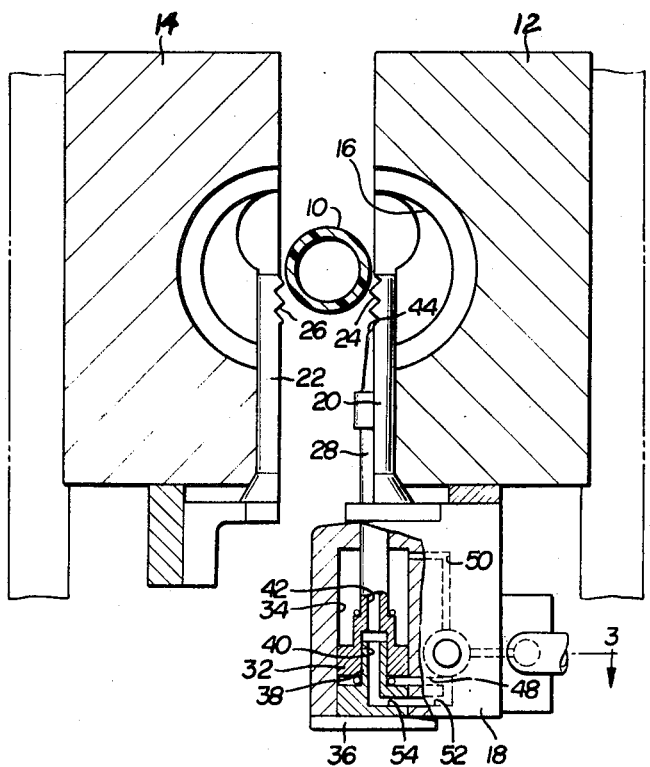
FIG. 2

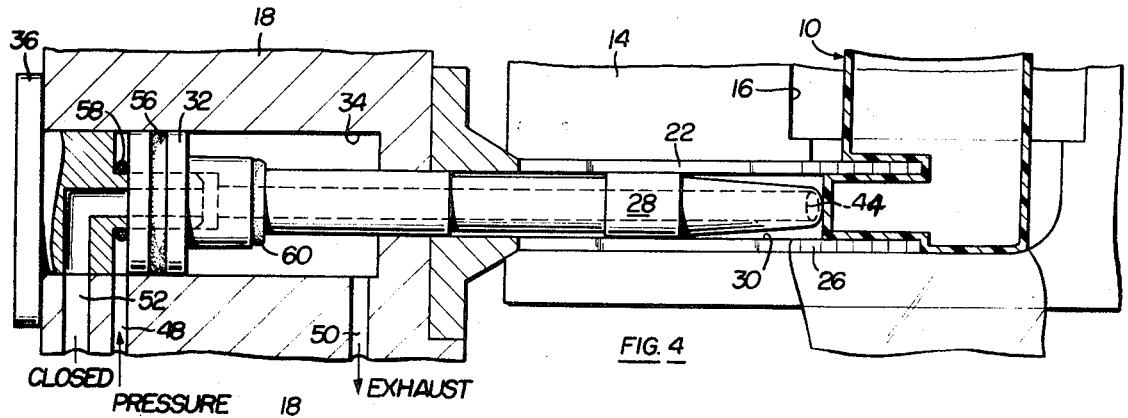
FIG. 4
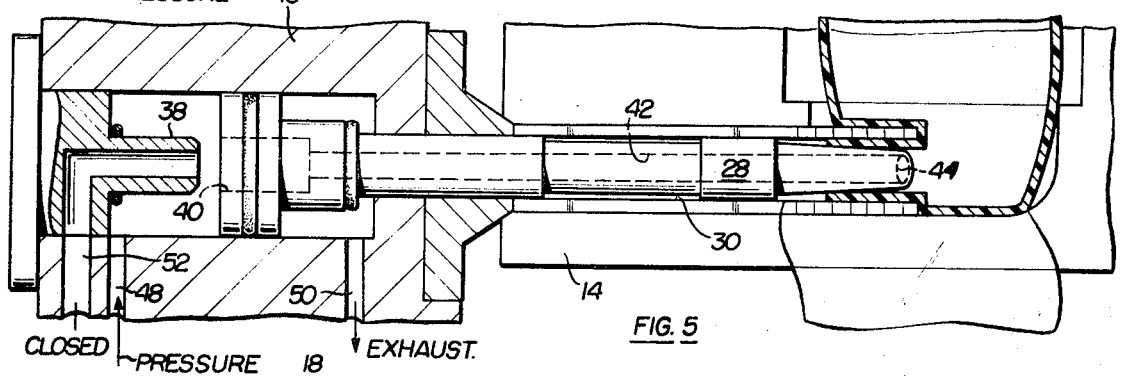
FIG. 5
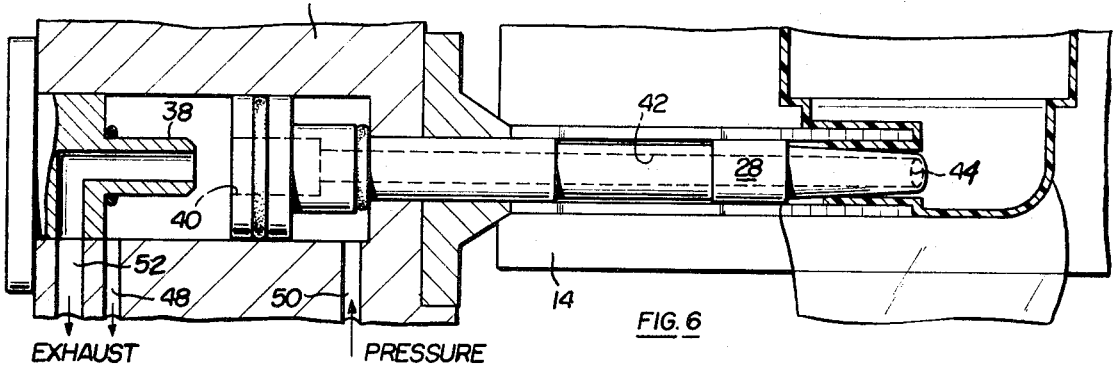
FIG. 6
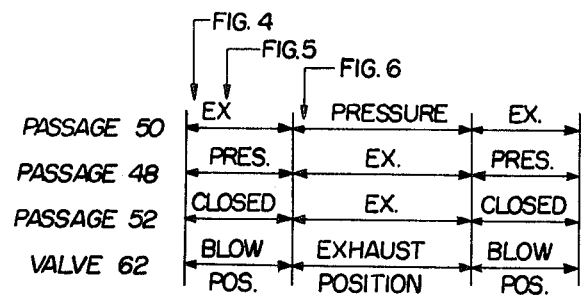
FIG. 7
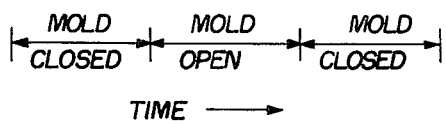

BLOW NEEDLE AND VALVE

BACKGROUND OF INVENTION

The present invention is particularly adapted for use in high speed blow molding machines, an example of which is disclosed in the copending commonly assigned application of Criss and Pollitt entitled "Method and Apparatus for Blow Molding Plastic Articles," Ser. No. 835,091, filed June 20, 1969. In high speed blowing systems, a considerable portion of the time required for a blowing cycle is consumed by the chilling of the blown plastic article. Heat must be removed from the hot extrusion after it is blown into its final shape within the mold cavity, so that the blown article will be rigid enough to maintain its blown shape without deformation or damage after it is removed from the mold.

To accelerate this cooling, the mold may be cooled or even refrigerated. The cooling will be further enhanced if the blown article is maintained firmly in contact with the cold mold cavity walls for the maximum possible time during the blowing operation. Maximum contact time is facilitated by achieving maximum blow pressure at the earliest possible moment after the mold is closed, and maintaining such pressure within the blown article until immediately prior to opening of the mold, when the blown article is rapidly exhausted of the blowing air.

The blowing or inflation of the extrusion may be accomplished by a hollow blow needle which penetrates one wall of the extruded plastic tube within the mold cavity, to permit air to be injected through the needle into the interior of the plastic tube. Effective blowing requires that the needle be driven through the tube with sufficient force to provide a clean opening with minimum leakage. Proper penetration also requires that means be provided for preventing the tube from yielding or being displaced under the impact of the penetrating needle. For example, a dull needle point might tend to merely deflect the tube rather than penetrate it. Premature application of blow pressure to the plastic tube prior to penetration by the needle might also cause the tube to deflect away from the advancing needle.

Hence, it is the principal object of this invention to provide an improved system for supplying and injecting blowing air into the plastic extrusion within the molding cavity.

It is a further object of this invention to provide an air injection system which assures rapid and complete penetration of the plastic extrusion by the blow needle.

It is another object of this invention to provide an air injection system which provides maximum duration of full inflation pressure within the blown object.

It is a still further object of this invention to provide an air injection system which minimizes time lag and pressure drop between the air control system and the mold cavity.

BRIEF DESCRIPTION OF THE DRAWINGS

FIG. 1 is an elevation of a closed two-part blow mold.

FIG. 2 is a cross-section viewed in the direction of arrows 2—2 of FIG. 1, showing the two mold halves slightly separated.

FIG. 3 is a cross-section through the valve body portion of the structure of FIG. 2, viewed in the direction of arrows 3—3 of FIG. 2.

FIGS. 4 through 6 are cross-sectional views through the blow needle, viewed in the direction of arrows 4—4 of FIG. 1, and showing the blow needle in three different stages of the blowing cycle.

FIG. 7 is a time chart showing the condition of various elements of the blowing system during the blowing cycle.

DETAILED DESCRIPTION OF THE INVENTION

Referring to FIGS. 1 and 2 of the drawing in particular, an extruded plastic tube or parison 10 is shown projecting from the upper end of closed mold halves 12 and 14 which contain a cavity 16 which, by way of example, may be adapted to create a plastic bottle when the extruded tube within is inflated and chilled. The mold halves are mounted to swing toward and away from each other by a mechanical drive which may take the form shown in the above mentioned copending application, or as shown in copending application of Robert Kontz entitled "Overload Arm for Mold." The mold halves may also reciprocate vertically during the blowing cycle. However, the present invention does not relate to such motions, and the corresponding structure has therefore been omitted from the drawings.

A blow needle and valve body 18 is carried by mold half 12 for movement therewith. As best shown in FIG. 2, wherein the mold halves are shown slightly opened, a blow needle guide cylinder 20 is split along its diameter into two separate elements 20,22, one carried by each mold half. The open end of each half of the guide cylinder is provided with opposed gripping faces 24, 26, respectively, which may be toothed or otherwise roughened to assure that the extruded tube 10 will be firmly gripped and held in place during the penetration by the blow needle and the subsequent inflation step. If desired, guide cylinder 20,22 could be formed as one element, carried by mold half 12, except for a split portion at the open end to provide gripping faces 24, 26.

As shown in FIG. 4, blow needle 28 is slidably mounted within bore 30 of guide cylinder 20. The left end of blow needle 28 is enlarged to form piston 32 which moves within guide cylinder chamber 34. The left end of chamber 34 is sealed by a plug 36 on which is formed a concentric axially extending projection 38 which is dimensioned to fit within counterbored seat 40 in blow needle 28. A central longitudinal bore 42 runs the full length of blow needle 28, and the right end of needle 28 is tapered to form a pointed tip 44.

Blow needle and valve body 18 also includes a valve bore 46, (see FIGS. 2 and 3) which is connected to guide cylinder chamber 34 by blow passage 48, needle return passage 50 and supplemental needle exhaust passage 52, as will be more fully explained below. An extension 54 of passage 52 is formed within chamber plug 36.

Piston 32 carries a sealing ring 56. Another ring 58 functions to cushion the seating of needle 28 against plug 36, and to maintain the necessary gap between plug 36 and piston 56 to assure application of air pressure to the piston from passage 48. A third ring 60 functions to cushion the seating of needle 28 against the right end of chamber 34, and to seal guide cylinder bore 30 during the blowing step.

Referring to FIG. 3, valve bore 46 of body 18 carries a valve spool 62 having lands 64, 66, 68 and 70. A compression return spring 72 maintains spool 62 in the position shown. Movement of the spool against the compression of return spring 72 is effected by valve control means schematically illustrated at 74.

Valve spool 62 controls and directs air flow between passages 48, 50 and 52 leading to guide cylinder chamber 34 and exhaust passages 74 and 76, and inlet passage 80 leading to a source of air pressure 82.

OPERATION

The operation of the system of this invention will be best understood by reference to FIGS. 4 through 7.

FIG. 7 is a time chart showing one and a half cycles of the system. The blowing operation begins immediately after mold halves 12 and 14 are closed upon extruded plastic tube 10. Appropriate control means sense the closing of the molds. These control means, schematically illustrated at 74 in FIG. 3, may comprise such elements as cams, limit switches, solenoids or air-operated pilot valves, as will be understood by those skilled in the art.

Thus, the closing of mold halves 12 and 14 initiates shifting of valve spool 62 from its illustrated exhaust position to its blow position, wherein blow passage 48 is connected to inlet passage 80 between valve lands 64 and 66, needle return passage 50 is connected to exhaust passage 78 between lands 66 and 68, and supplemental needle exhaust passage 52 is blocked off between lands 68 and 70.

Thus, at the instant following the shift of valve spool 62 to its blow position, the blow needle 28 will be in the condition shown in FIG. 4. Air pressure applied to the left face of piston 32 from passage 48 will drive the needle 28 toward the right. It is important to note from FIG. 4 that no air pressure can enter blow needle bore 42, since passages 52 and 54 are blocked off at valve 62, and since the internal valve formed by the seating of chamber plug projection 38 within seat 40 of needle 28 blocks communication between passage 48 and bore 42. Thus, all of the available pressure from passage 48 is utilized to impart a driving force to needle 28, to assure rapid and complete penetration of extruded plastic tube 10. Furthermore, the absence of an air stream emanating from needle bore 42 reduces the likelihood of plastic tube 10 being deflected or blown away from the advancing needle.

Continued travel of blow needle 28 toward the right ultimately exposes blow needle bore 42 to the pressure from passage 48, as shown in FIG. 5. The axial length of projection 38 is selected so that this will not occur until tip 44 of blow needle 28 has penetrated extruded tube 10. Inflation or blowing of the tube will therefore begin and continue during the remainder of the stroke of blow needle 28. This arrangement thus assures that inflation begins at the earliest possible moment following penetration of the tube by needle 28.

Full blow pressure is maintained until immediately before time for opening mold halves 12 and 14. An appropriate signal to valve control means 74 permits compression spring 72 to return valve spool 62 to its position illustrated in FIG. 3. At this point, air pressure is applied to needle return passage 50 from inlet 80, and passages 48 and 52 are exhausted via exhaust passages 76 and 78, respectively. This condition is illustrated in FIG. 6. Blow needle 28 is thereby driven back toward its withdrawn position.

The pressurized air within the blown object is initially exhausted through blow needle bore 42 and passages 48 and 52. When the internal valve formed by chamber plug projection 38 and seat 40 once again closes, all of the blow air continuing to enter needle bore 42 from the blown object is directed to exhaust through passages 54, 52 and 78. At this point, needle 28 will have withdrawn from the blown object, and some of the pressure remaining within the blown object will exhaust to atmosphere from the punctured tube wall, without entering bore 42 of blow needle 28.

Thus, the provision of two exhaust passages, 48 and 54, permit rapid exhausting of the blown object, permitting the maintenance of full blow pressure until the last possible moment.

By placing valve spool 62 immediately adjacent blow needle 28, substantially instantaneous response is facilitated, without significant time lag or pressure drop. This further enlarges the time during which full blown pressure may be maintained within the blown article.

It will be understood that the internal valve formed by chamber plug projection 38 and seat 40 in blown needle 28 could be formed in the reverse of the illustrated version, that is, the male projection 38 could be formed on the end of piston 32, while the counterbored seat or female portion 40 could be formed in chamber plug 36. The operation described above would remain unchanged.

This invention may be further developed within the scope of the following claims. Accordingly, the above specification is to be interpreted as illustrative of only a single operative embodiment of this invention, rather than in a strictly limited sense.

I now claim:

1. In a blow molding machine comprising a pair of separable blow mold halves adapted to be closed around an extruded plastic tube to seal off and contain the tube as it is expanded by air pressure to fill and assume the shape of the mold, the improved system for supplying and injecting the blowing air which comprises:

a hollow guide cylinder carried by the mold halves for movement therewith, the bore of said cylinder being open at a first end for communication with the mold cavity, and being enlarged at the second end to form a chamber;

a hollow blow needle slidably mounted for longitudinal movement within said guide cylinder bore, said blow needle having a first end dimensioned to extend out beyond said open first end of said guide cylinder to penetrate the extruded tube when said needle is selectively extended to its blowing position, the second end of said needle having an enlarged diameter to form a piston adapted to slide within said guide cylinder chamber between an extended and a withdrawn position at the first and second ends of said chamber, respectively;

a source of pressurized air;

valve means connected by a plurality of conduits to said source of pressurized air, to the atmosphere and to said guide cylinder chamber, including first and second conduits interconnecting said valve means and the first and second ends, respectively, of said guide cylinder chamber;

valve control means connected to said valve means for causing said valve means to selectively move between a blow position and an exhaust position in response to predetermined signals;

in said blow position of said valve means, said first end of said chamber being exhausted via said first conduit, and said second end of said chamber being pressurized via said second conduit to drive said piston and blow needle to its extended blowing position;

in said exhaust position of said valve means, said first end of said chamber being pressurized via said first conduit and said second end of said chamber being exhausted via said second conduit to drive said piston and blow needle to its withdrawn exhaust position;

and blow pressure control means forming a portion of the air supply system for blocking the supply of pressurized air to the bore of said blow needle until said blow needle has traveled a predetermined portion of its stroke toward its extended blowing position;

whereby blow pressure is supplied to said blow needle bore and to the extruded tube only after said blow needle has penetrated the wall of the extruded tube.

2. The air supply system of claim 1, wherein said blow pressure control means exhausts said blow needle bore continuously throughout its movement from its extended blowing position toward its withdrawn position while said valve means is in its exhaust position.

3. The air supply system of claim 1, wherein the terminal portion of the length of said hollow guide cylinder adjacent said first end thereof is longitudinally split into two opposed sections, one carried by each mold half, with the opposed mating faces of said sections being provided with gripping teeth to clamp and hold a portion of the extruded tube therebetween as the mold halves close to thereby resist any tendency of the extruded tube to be forced off said blow needle during the penetrating or blowing steps.

4. In a blow molding machine comprising a pair of separable blow mold halves adapted to be closed around an extruded plastic tube to seal off and contain the tube as it is expanded by air pressure to fill and assume the shape of the mold, the improved system for supplying and injecting the blowing air which comprises:

a hollow guide cylinder carried by the mold halves for movement therewith, the bore of said cylinder being open at a first end for communication with the mold cavity, and being enlarged at the second end to form a chamber;

a hollow blow needle slidably mounted for longitudinal movement within said guide cylinder bore, said blow needle having a first end dimensioned to extend out beyond said open first end of said guide cylinder to penetrate the extruded tube when said needle is selectively extended to its blowing position, the second end of said needle having an enlarged diameter to form a piston adapted to slide within said guide cylinder chamber between an extended and a withdrawn position at the first and second ends of said chamber, respectively;

a source of pressurized air;

valve means connected by a plurality of conduits to said source of pressurized air, to the atmosphere and to said guide cylinder chamber, including first and second conduits interconnecting said valve means and the first and second ends, respectively, of said guide cylinder chamber;

said second end of said guide cylinder chamber and the opposed end of said blow needle piston having axially extending mating male and female portions which function when mated to block communication between said second conduit and the bore of said blow needle without blocking the entry port of said second conduit into said guide cylinder chamber during a predetermined portion of the stroke of said blow needle from its withdrawn position toward its blowing position, and which establishes communication between said second conduit and the bore of said blow needle only when said male portion has withdrawn from said female portion upon the completion of said predetermined portion of the stroke of said blow needle;

valve control means connected to said valve means for causing said valve means to selectively move between a blow position and an exhaust position in response to predetermined signals;

in said blow position of said valve means, said first end of said chamber being exhausted via said first conduit, and said second end of said chamber being pressurized via said second conduit to drive said piston and blow needle to its extended blowing position;

in said exhaust position of said valve means, said first end of said chamber being pressurized via said first conduit and said second end of said chamber being exhausted via said second conduit to drive said piston and blow needle to its withdrawn exhaust position;

whereby when said predetermined portion of the stroke of said blow needle is selected to assure penetration of the extruded tube, blow pressure will be supplied to the bore of said blow needle via said second conduit only after said blow needle has penetrated the extruded tube.

5. The air supply system of claim 4, wherein a third conduit interconnecting said valve means with said second end of said guide cylinder chamber is positioned to be at all times in communication with the bore of said blow needle, said third conduit being blocked by said valve means in said blow position of said valve means, and said third conduit being exhausted in said exhaust position of said valve means.

6. The air supply system of claim 4, wherein the terminal portion of the length of said hollow guide system adjacent said first end thereof is longitudinally split into two opposed sections, one carried by each mold half, with the opposed mating faces of said sections being provided with gripping teeth to clamp and hold a portion of the extruded tube therebetween as the mold halves close to thereby resist any tendency of the extruded tube to be forced off said blow needle during the penetrating or blowing steps.

7. The air supply system of claim 4 wherein said valve means is mounted on one of said mold halves, to minimize time lag and pressure drop between said valve means and said blow needle.

* * * * *